US006547901B1

(12) United States Patent
Gerlich

(10) Patent No.: US 6,547,901 B1
(45) Date of Patent: Apr. 15, 2003

(54) REINFORCED PLASTERBOARD

(75) Inventor: Johan Theodoor Gerlich, Wellington (NZ)

(73) Assignee: Milliken & Company, Spartanburg, NC (US)

( * ) Notice: Subject to any disclaimer, the term of this patent is extended or adjusted under 35 U.S.C. 154(b) by 0 days.

(21) Appl. No.: 09/446,409

(22) PCT Filed: Jul. 16, 1998

(86) PCT No.: PCT/NZ98/00105

§ 371 (c)(1),
(2), (4) Date: Mar. 15, 2000

(87) PCT Pub. No.: WO99/04112

PCT Pub. Date: Jan. 28, 1999

(30) Foreign Application Priority Data

Jul. 16, 1997 (NZ) ............................................ 328339

(51) Int. Cl.$^7$ ............................................ B32B 3/18

(52) U.S. Cl. ............................ 156/42; 156/39; 156/40; 156/41; 156/44; 156/45

(58) Field of Search ............................ 442/20, 33, 34, 442/43, 38, 42; 156/39–42, 44, 45

(56) References Cited

U.S. PATENT DOCUMENTS

| | | | | |
|---|---|---|---|---|
| 3,944,698 A | * | 3/1976 | Dierks et al. | 428/219 |
| 3,993,822 A | | 11/1976 | Knauf et al. | 428/213 |
| 4,020,237 A | | 4/1977 | von Hazmburg | 428/535 |
| 4,378,405 A | | 3/1983 | Pilgrim | 428/322.7 |
| 4,450,022 A | | 5/1984 | Galer | |
| 4,504,533 A | | 3/1985 | Altenhofer et al. | 428/70 |
| 4,544,424 A | | 10/1985 | Take et al. | 156/39 |
| 4,916,004 A | | 4/1990 | Ensminger et al. | 428/192 |
| 5,030,502 A | | 7/1991 | Teare | 428/143 |
| 5,220,762 A | | 6/1993 | Lehnert et al. | 52/408 |
| 5,225,237 A | * | 7/1993 | Magnani | 428/227 |
| 6,159,410 A | | 12/2000 | Haga | |
| 6,176,920 B1 | | 1/2001 | Murphy et al. | 106/711 |

FOREIGN PATENT DOCUMENTS

| | | |
|---|---|---|
| DE | 28 54 228 | 6/1980 |
| DE | 34 06 449 | 8/1985 |
| FR | 2 323 504 | 5/1977 |
| JP | 53-146724 | 12/1978 |
| JP | 55-146736 | 11/1980 |
| JP | 04-69301 | 3/1992 |
| WO | WO98/09033 | 3/1998 |

* cited by examiner

*Primary Examiner*—Elizabeth M. Cole
*Assistant Examiner*—Ula C. Ruddock
(74) *Attorney, Agent, or Firm*—Christie, Parker & Hale, LLP

(57) ABSTRACT

A reinforced plasterboard has a first layer of paper, a core of a cementitious material, a mesh reinforcement and adjacent to that mesh reinforcement a further layer of paper. The mesh may be in contact with the paper layer.

7 Claims, 2 Drawing Sheets

REINFORCED PLASTERBOARD

BACKGROUND OF THE INVENTION

The present invention relates to reinforced plasterboard. The term "plasterboard" will, for simplicity, be used throughout the specification to refer to a building material which is formed from any cementitious slurry resulting in a panel of indefinite length which will be then cut to the required sizes. The term "panel" is intended in this specification to cover any type of wall, ceiling or floor component of any required size. Numerous proposals have been put forward in the past, many of them patented, relating to the construction of such plasterboard panels.

Typically, such plasterboard panels have utilised a gypsum or Portland cement slurry. Some of the existing proposals for plasterboard have included the introduction of a reinforcement into the cementitious slurry. This reinforcement has been proposed as comprising glass fibre sheets or fibres, for example.

The proposals for reinforced plasterboard to date have all suffered from various disadvantages, and in particular, a failure to provide a plasterboard which has superior strength to resist typical impacts which can result in a building in which the panel is used. For example, in a panel used as an interior lining in commercial and domestic buildings, it would need to be able to satisfactorily resist the forces of human impact over a substantial period of time.

OBJECTS OF THE INVENTION

It is thus an object of the present invention to provide a reinforced plasterboard and/or a method of producing same which will overcome or at least obviate disadvantages in such plasterboard or its method of production to the present time, or which at least will provide the public with a useful choice.

Further objects of this invention will become apparent from the following description.

SUMMARY OF THE INVENTION

According to one aspect of the present invention, a reinforced plasterboard including a first external layer of paper adjacent one side of a core of a cementitious material, at least one internal layer of a mesh reinforcement embedded within an opposite side of said core of cementitious material and a second external layer of paper immediately adjacent to said mesh reinforcement.

Preferably, the mesh reinforcement is in contact with the further layer of paper.

Preferably, the mesh reinforcement includes an open weave glass fibre mesh.

Preferably, the cementitious material includes gypsum plaster.

According to a further aspect of the present invention, a method of producing a reinforced plasterboard including providing a continuous feed of a cementitious slurry to spread over a first external layer of paper, a continuous feed of a second external layer of paper, a continuous feed of a reinforcing mesh so as to lie internally adjacent said second layer of paper, means for bringing said layers of paper, said cementitious slurry and said reinforcing mesh together to result in said cementitious slurry setting between said external layers of papers with said reinforcing mesh embedded on one side of said cementitious slurry and immediately adjacent said second external layer of paper.

Preferably, in the above method, the reinforcing mesh is in contact with said further layer of paper.

According to a still further aspect of the present invention, there is provided a reinforced plasterboard and/or method of producing same, substantially as herein described with reference to the accompanying drawings.

Further aspects of this invention which should be considered in all its novel aspects will become apparent from the following description, given by way of example of possible embodiments thereof and in which reference is made to the accompanying drawings.

BRIEF DESCRIPTION OF PREFERRED EMBODIMENTS

Figure 1:
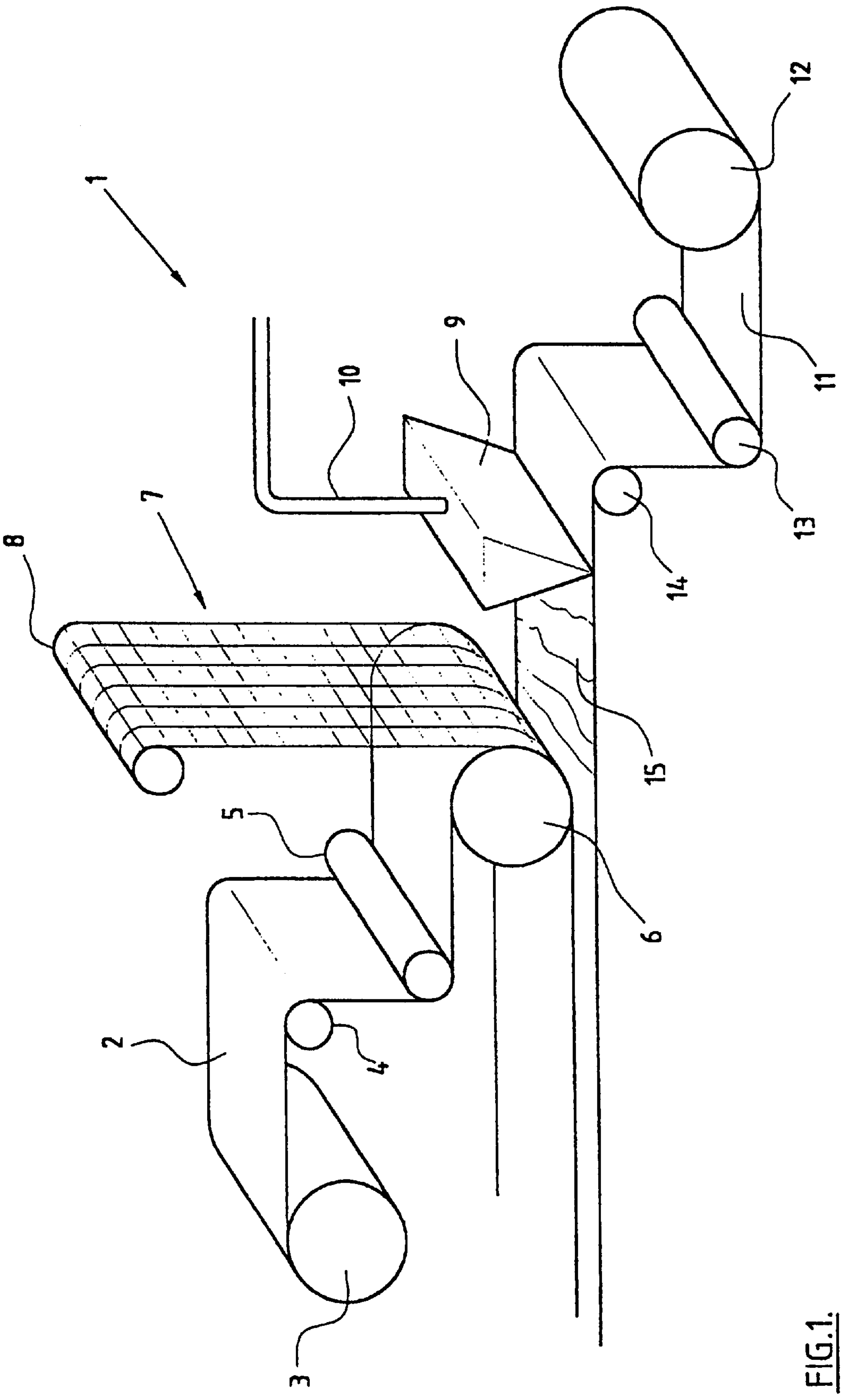
FIG. 1: shows very diagrammatically a production line for the continuous production of a reinforced plasterboard, according to one possible embodiment of the invention.

A continuous production line for the manufacturing of a reinforced plasterboard, and according to one possible embodiment of the invention, is referenced generally by arrow 1.

The manufacturing process is seen to involve in this particular embodiment the feeding of a back paper 2 along rollers 3, 4, 5 and 6, and the feeding of a reinforcing mesh 7 from roller 8, so as to lie adjacent the back paper 2, and in this embodiment contacting it.

The term "paper" is used throughout this specification to refer to any suitable outer facing material which is strong and may be a cardboard such as that made from recycled fibres which may include Kraft paper, or the like. The reinforcing mesh may be of any suitable type providing a required density and strength, but a glass fibre or plastics open weave mesh may be particularly suitable such as the commercially available CRENETE (trade mark) mesh.

A cementitious slurry 15 is shown being fed from a feeder 9 which distributes the slurry 15 across the width of a face paper 11, fed via rollers 12, 13 and 14. The slurry 15 may be of any suitable type, but in one preferred embodiment of the invention, may be a gypsum or Portland plaster. Suitable spreading means may be provided so as to ensure that the slurry 15 is distributed evenly across the width of the paper 11. Also guide means may be provided each side of the production line so as to turn up the sides of the paper 11 so as to form a trough in which the slurry 15 can be accommodated. It is envisaged that in one embodiment, the turned up sides of the paper 11 may then be folded over and adhered to the back paper 2.

The process will suitably include heating means to facilitate the setting of the slurry 15 and also cutting means, so that the resultant plasterboard can be cut into appropriate sizes.

It will be appreciated that although single layers of paper 2, 11 and reinforcing mesh 7 are shown being utilised any number of layers can be used as appropriate.

Figure 2:
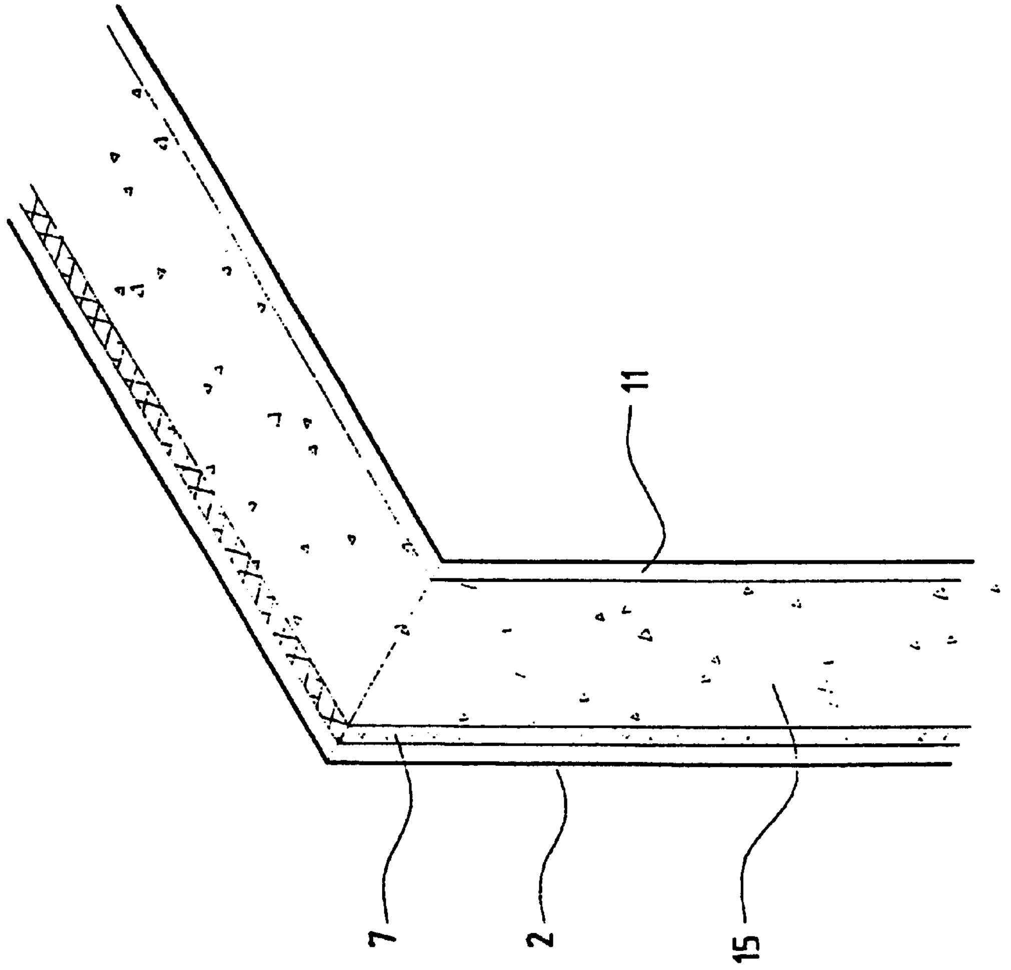
FIG. 2: shows very diagrammatically a cross sectional view through a reinforced plasterboard according to one possible embodiment of the invention.

Referring to FIG. 2, a reinforced plasterboard according to one possible embodiment of the invention is shown very diagrammatically with a face paper 11, a plaster core 15 such as of gypsum plaster, a reinforcing mesh 7 and immediately adjacent thereto, a back paper layer 2. While in setting, some of the plaster 15 will extrude through the openings in the mesh 7 and bond with the paper 2, the mesh 7 may be positioned so as to be in substantial contact across the entire face of the back paper 2. In this way, the reinforcing mesh 7 is providing a substantial and uniform reinforcement of the plasterboard across the entire face defined by the layer of paper 2 and will thus be able to contribute substantially to the impact resistance of the plasterboard.

In other embodiments the mesh 7 is adjacent the paper 2 but may not be in contact with it.

Where in the foregoing description reference has been made to specific components or integers of the invention having known equivalents then such equivalents are herein incorporated as if individually set forth.

Although this invention has been described by way of example and with reference to possible embodiments thereof it is to be understood that modifications or improvements may be made thereto without departing from the scope of the invention as defined in the appended claims.

What is claimed is:

1. A method of producing a reinforced plasterboard comprising providing a continuous feed of a cementitious slurry to spread over a first layer of paper, a continuous feed of a further paper layer, a continuous feed of a reinforcing mesh so as to lie adjacent said further paper layer, means for bringing said layers of paper, said cementitious slurry and said reinforcing mesh together to result in said cementitious slurry setting between said layers of papers with said reinforcing mesh adjacent said further layer of paper, wherein the sides of the first layer of paper are turned up so as to form a trough in which the cementitious slurry can be accommodated.

2. A method of producing reinforced plasterboard as claimed in claim 1 wherein said mesh reinforcement is immediately adjacent to and in contact with said second external layer of paper.

3. A method of producing a reinforced plasterboard as claimed in claim 1 wherein the said sides of the first layer of paper are folded over and adhered to the further paper layer.

4. A method of producing a reinforced plasterboard as claimed in claim 1 further comprising providing heating means to facilitate the setting of the cementitious material.

5. A method of producing a reinforced plasterboard as claimed in claim 1 wherein the reinforcing mesh comprises fiberglass.

6. A method of producing a reinforced plasterboard as claimed in claim 1 wherein the cementitious slurry comprises gypsum.

7. A method of producing a reinforced plasterboard as claimed in claim 1 wherein the cementitious slurry comprises plaster.

* * * * *

UNITED STATES PATENT AND TRADEMARK OFFICE

CERTIFICATE OF CORRECTION

PATENT NO. : 6,547,901 B1
APPLICATION NO. : 09/446409
DATED : April 15, 2003
INVENTOR(S) : Gerlich It is certified that error appears in the above-identified patent and that said Letters Patent is hereby corrected as shown below:

On the Title Page

| | |
|---|---|
| (73) Assignee | Delete "Spartanburg, NC",<br>Insert --Spartanburg, SC-- |
| Column 4, lines 8-9, Claim 2 | Delete "second external",<br>Insert --further-- |

Signed and Sealed this

Twenty-fourth Day of October, 2006

JON W. DUDAS
*Director of the United States Patent and Trademark Office*